J. R. STEVENSON.
STENTERING OR STRETCHING DEVICE APPLICABLE TO HEATED CYLINDRICAL CAN DRYING MACHINES AND THE LIKE FOR TEXTILE FABRICS.
APPLICATION FILED JULY 6, 1918.

1,336,385.

Patented Apr. 6, 1920.
13 SHEETS—SHEET 1.

J. R. STEVENSON.
STENTERING OR STRETCHING DEVICE APPLICABLE TO HEATED CYLINDRICAL CAN DRYING MACHINES AND THE LIKE FOR TEXTILE FABRICS.
APPLICATION FILED JULY 6, 1918.

1,336,385.

Patented Apr. 6, 1920.

Inventor.
John R. Stevenson.
By Howson & Howson
Attorneys.

J. R. STEVENSON.
STENTERING OR STRETCHING DEVICE APPLICABLE TO HEATED CYLINDRICAL CAN DRYING MACHINES AND THE LIKE FOR TEXTILE FABRICS.
APPLICATION FILED JULY 6, 1918.

1,336,385.

Patented Apr. 6, 1920.

Inventor.
John R. Stevenson.
By. Howson & Howson.
Attorneys.

J. R. STEVENSON.
STENTERING OR STRETCHING DEVICE APPLICABLE TO HEATED CYLINDRICAL CAN DRYING
MACHINES AND THE LIKE FOR TEXTILE FABRICS.
APPLICATION FILED JULY 6, 1918.

1,336,385.

Patented Apr. 6, 1920.
13 SHEETS—SHEET 13.

Inventor
John R. Stevenson.
By Howson & Howson
Attorneys

UNITED STATES PATENT OFFICE.

JOHN R. STEVENSON, OF GLASGOW, SCOTLAND.

STENTERING OR STRETCHING DEVICE APPLICABLE TO HEATED CYLINDRICAL CAN-DRYING MACHINES AND THE LIKE FOR TEXTILE FABRICS.

1,336,385.      Specification of Letters Patent.      Patented Apr. 6, 1920.

Application filed July 6, 1918. Serial No. 243,682.

*To all whom it may concern:*

Be it known that I, JOHN ROSS STEVENSON, a subject of the King of Great Britain and Ireland and the Isle of Man, and a resident of Glasgow, Scotland, bleacher, have invented new and useful Improvements in Stentering or Stretching Devices Applicable to Heated Cylindrical Can-Drying Machines and the like for Textile Fabrics, of which the following is a specification.

This invention has reference to improvements in and relating to stentering or stretching devices applicable to heated cylindrical can drying machines and the like for textile fabrics and particularly relates to that form of stentering machine in which the cloth is carried lengthwise and held stretched cross-wise by an endless chain member provided with clips or stentering pins at each side of the machine around and in actual contact with a considerable portion of each cylinder or can of a series of heated rotatable cylinders arranged side by side and around grooved wheels arranged above and between each pair of cylinders.

The chains travel in endless grooves formed partly in rails carried by inner movable frames arranged between the fixed outer framework of the machine and partly in the periphery of the aforesaid wheels and partly in loose slidable rings mounted on each cylinder.

The distance apart of the chains is regulated to suit the width desired by means of right and left hand screws which operate the inner movable frames. The loose rings on the cylinders slide along same as the chains are drawn inward and outward.

According to the improvements of this invention the grooved wheels are arranged below the cylinders instead of above same and are carried by a framework adapted to be drawn inward and outward by right and left hand screws. The mechanism for operating the screws is preferably provided with an indicator or the like so as to show the width of the cloth being handled. The said movable frames are provided with means for positively positioning the rings on the cylinders. The endless chain members comprise clips provided with double joints so that the return wheels for same may lie in a horizontal plane and thus facilitate the insertion of the cloth as the jaws of the clips are automatically opened by the return wheels or by devices secured to same. As the chains engage the wheels the clips are forced open and held in that position until the chains pass again from the wheels. Heated air may be directed on the cloth by suitably formed ducts. The clips are also so formed that a channel is provided so that the heated air may to some extent be retained by the clip thereby keeping the clip and the selvages of the cloth heated. The air may strike a baffle plate or the like arranged on the axle of the grooved wheels and be deflected on to the clips and selvages of the cloth and again into the space formed by the cloth as the chains carrying same pass around the wheels. The wheel axles, which do not rotate, are provided with telescopic rods or drums having suitable radial or like joints so as to support the cloth as the chains pass around the wheels. An automatic adjustment or compensating device is arranged for the chain as its length varies due to changes of temperature.

In order that others skilled in the art to which the improvements of this invention relate may properly understand same I have hereunto appended 19 sheets of explanatory drawings in which:—

To connect these three views, in order that the complete elevation of the machine may be understood, the line A—A (Fig. 1) coincides with the line B—B (Fig. 2) and the line C—C (Fig. 2) coincides with the line D—D (Fig. 3).

The mechanism I shown at the one end of the machine (Fig. 1) is not illustrated in Fig. 4 as it forms no part of the invention.

All these views are shown divided for convenience of illustration.

Fig. 12 is drawn to a larger scale than Figs. 13 and 14.

Fig. 19 is an elevation and Fig. 20 is a plan view of a portion of the inner movable structure and illustrates the return race or groove for the chain carrying the cloth while

Figs. 23, 24, 25 and 26 are respectively part elevations of the boxes for supplying heated air to the machine, and to connect these views the line L—L (Fig. 23) coincides with the line M—M (Fig. 24), the line N—N (Fig. 24) coincides with the line O—O (Fig. 25) and the line P—P (Fig. 25) coincides with the line Q—Q (Fig. 26).

To connect these views the line R—R (Fig. 27) coincides with the line S—S (Fig. 28), the line T—T (Fig. 28) coincides with the line U—U (Fig. 29), and the line V—V (Fig. 29) coincides with the line W—W (Fig. 30).

Referring to these drawings:—

In carrying the improvements of this invention into effect or practice the stentering machine consists of two main frames 1 carried by standards 2 and provided with suitable bearings 3 for a plurality of heated and rotatable cylinders or cans 4 arranged side by side transversely between the frames 1. The frames 1 and the bearings 3 are formed hollow or with passages or ducts 5 (shown in detail in Fig. 11) so as to conduct the steam or other heating medium to the cylinders 4.

Below and between each pair of cylinders 4 at each end of same that is at each side of the machine, a wheel 6 shown in detail Figs. 35 to 38 is arranged having its periphery grooved to form a chain race 7. The cylinders 4 are provided at each end with a slidable ring 8 (Figs. 12 to 14) also having a chain race 9. The grooved wheels 6 on each side of the machine are carried in bearings 10 (Fig. 39) fitted to frames 11 adapted to be drawn together and apart by right and left hand screwed shafts 12 (Figs. 1 to 6). These screwed shafts 12 are operated from the shaft 13 by worm and worm wheel gear 14 and the shaft 13 is driven from the main shaft 15 of the machine in either one direction or the other by suitable mechanism such as the skew gear illustrated which consists of a pair of couple skew or angled toothed wheels 16 and 17 slidably mounted on shaft 13 which is at right angle to main shaft 15 which is also provided with a similar pair of wheels, 18 and 19. As the wheel 16 on the shaft 13 engages with the wheel 18 on the shaft 15 the screwed shafts 12 are rotated in the one direction and as the pairs of coupled wheels are slid along their respective shafts so that the other wheels 17 and 19 engage with each other the screwed shafts 12 are rotated in the other direction.

The frames 11 are supported by cross frames or bearers fitted to the standards 2 and are provided with grooves 21 to form the return race for the chains. Brackets 22 arranged between each pair of cylinders 4 and carried by the movable frames 11 are connected together by upper frames similar to the frames 11 but without the groove 21 adapted to be drawn together or apart by right and left hand screwed shafts 24 operating in unison with the right and left hand screwed shafts 12. The screwed shafts 24 are operated by worm and worm wheel gear 25 from the shaft 26, driven from the shaft 13 by chain and chain wheel gear 27 and carried by brackets 28 fitted to upper frames 29 supported on brackets 30 carried by the main frames 1.

It will be readily understood that as the screwed shafts 12 and 24 are rotated in either the one direction or the other the structure comprising the lower frames 11, brackets 22, and upper frames is drawn together or apart. The brackets 22 at the points 31 (Figs. 1 and 2) are provided with studs or the like having anti-friction rollers 32 (indicated in Fig. 12) which work in grooves 33 formed on the rings 8 on the cylinders 4. This insures that the rings will be properly positioned on the cans and not be held in position by the chains of clips.

The cylinders are rotated from the main driving shaft 15 by chain and chain wheel gears 34 so that their surface speed equals the speed of travel of the chains of clips which are also driven from the main shaft by sprocket wheel or like gear. The main frames 1 are extended at both ends of the machine by extension frames 35 supported on standards 36.

Figures 15, 16, 17, 35, 36, 38:
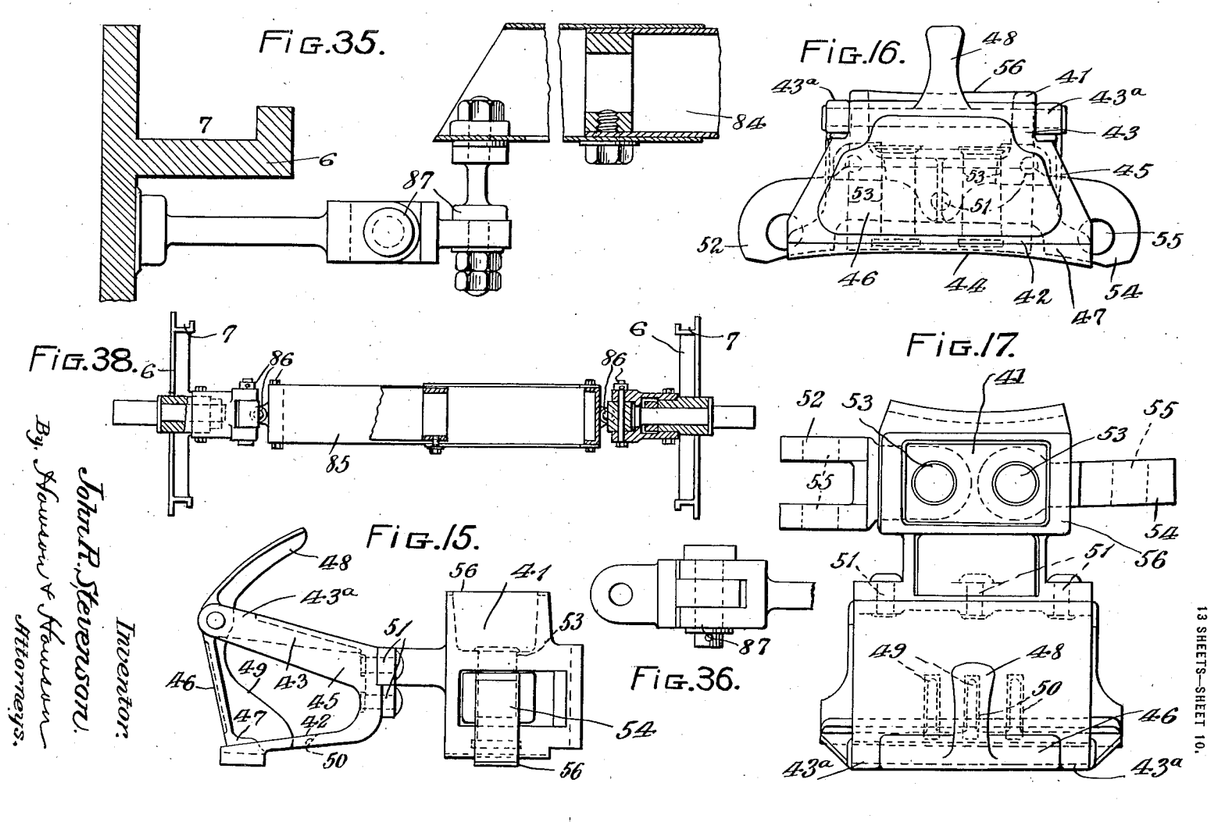
Figs. 15 and 16 are respectively elevations at right angles to each other and Fig. 17 is a plan view of one of the links of the endless chain for carrying the cloth.
Fig. 35 is a sectional elevation (broken away) of a portion of one of the grooved wheels and illustrates one construction of telescopic bars for forming drums between the wheel on the one side of the machine and the wheel directly opposite same.
Fig. 36 is a plan view of a portion of Fig. 35 and illustrates a joint.
Fig. 38 is a sectional elevation of the grooved wheels on both sides of the machine connected by a telescopic axle.
Figure 18:
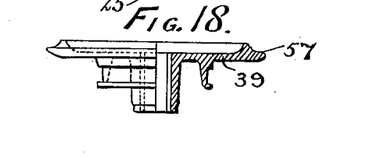
Fig. 18 is a sectional elevation of one of the return wheels for the chain.
Figure 19:
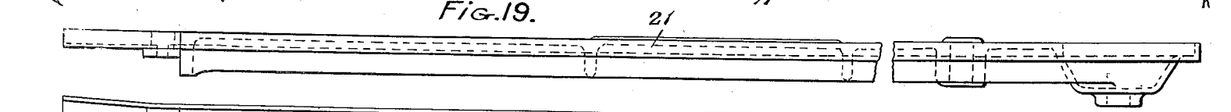
Figure 20:
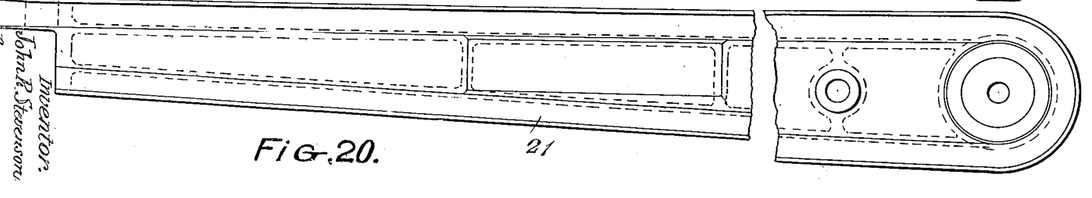
Figure 21:
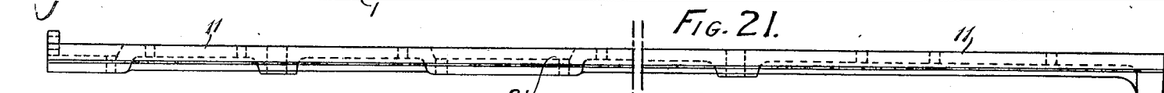
Figs. 21 and 22 are similar views of another portion of the movable structure.
Figure 22:
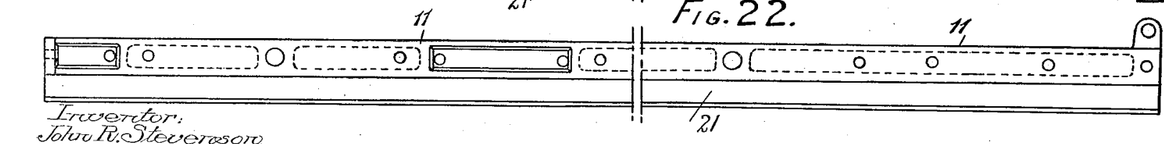
Figure 23:
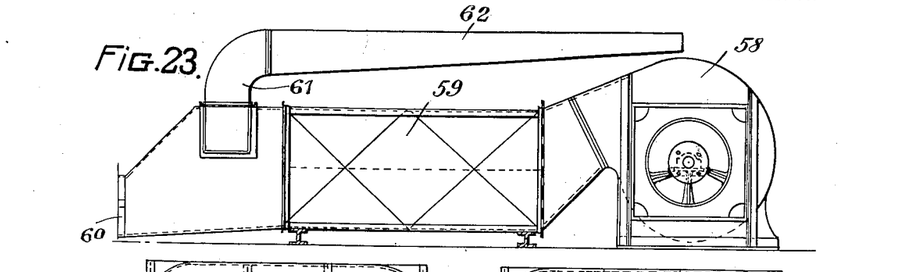
Figure 24:
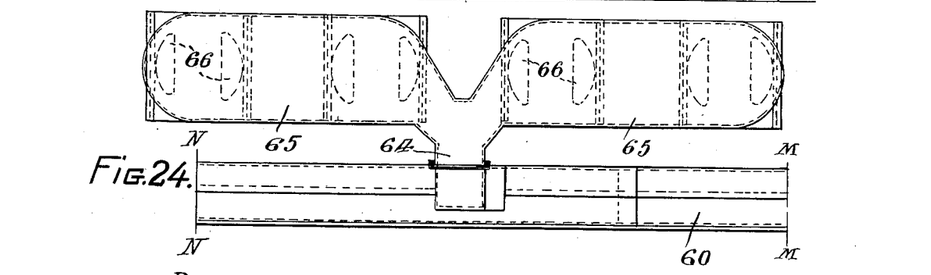
Figure 25:
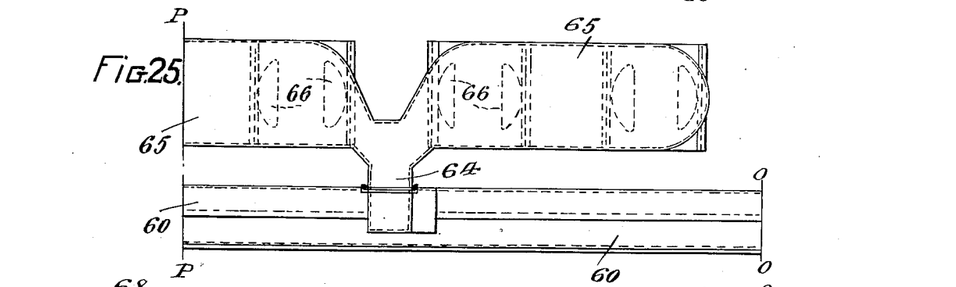
Figure 26:
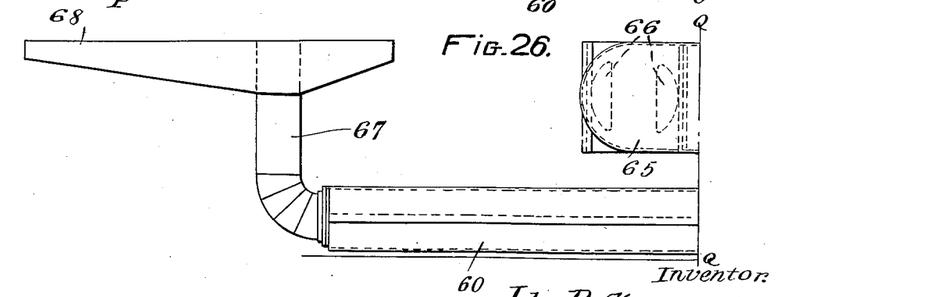
Figure 27:
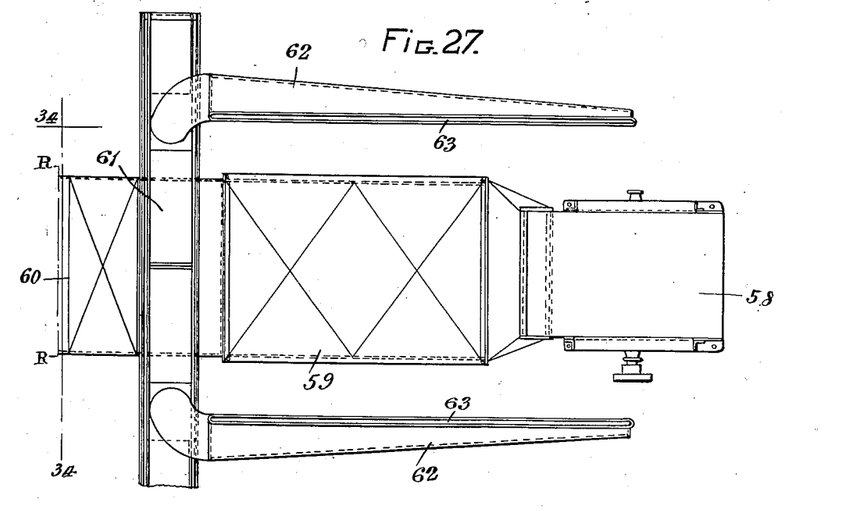
Figs. 27, 28, 29 and 30 are respectively part plan views of the said air boxes illustrated by Figs. 23 to 26.
Figure 28:
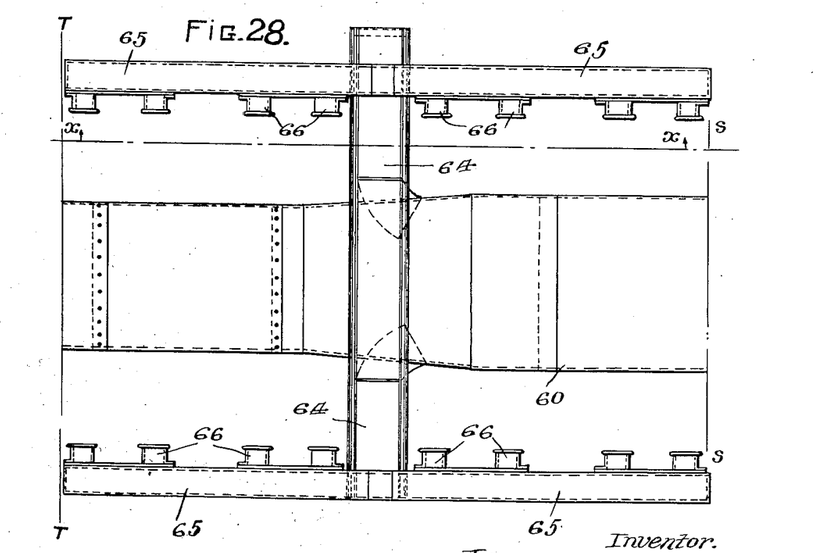
Figure 29:
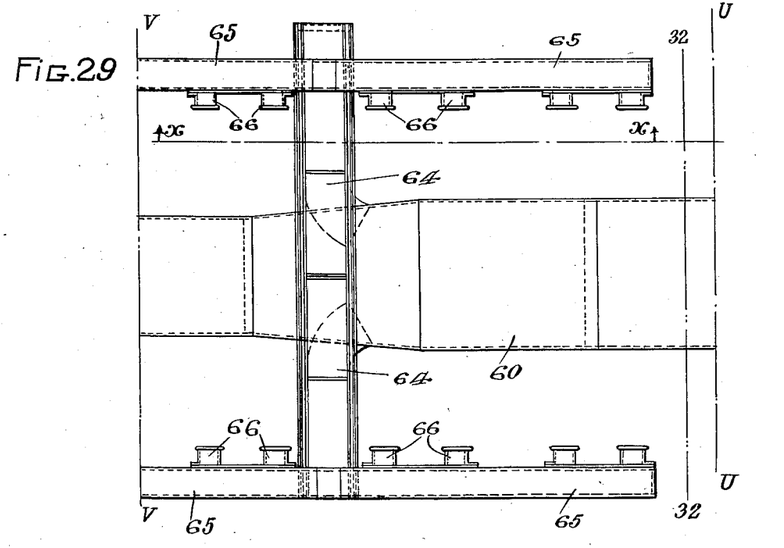
Figure 30:
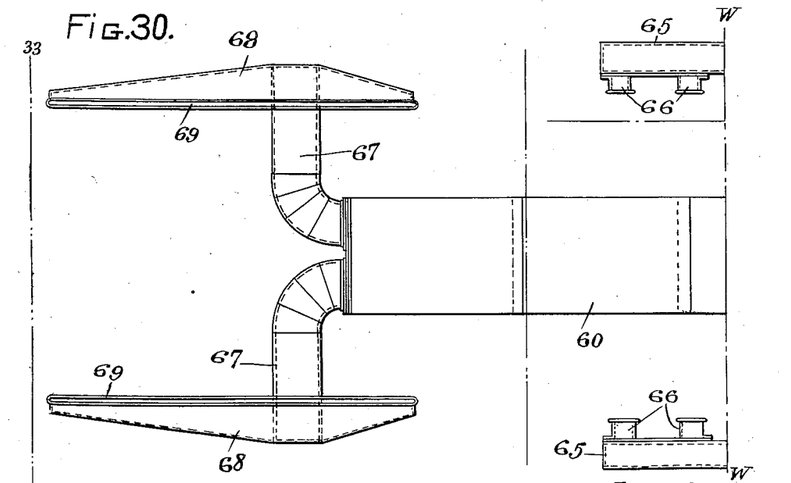

The frames 11 having the grooves 21 are provided at both ends of the machine with end frames 37 Figs. 17 and 18 formed with chain races or grooves 38. These grooves 38 are curved or circled around a center which is provided with a return wheel 39 (Fig. 18). One portion of the groove 38 at each end of the machine is in line with the grooves 21 and the other portion of the grooves 38 is arranged in line with a groove formed in carrier wheels 40 also at each end of the machine. These carrier wheels 40 which are also carried by the frame 11 conduct the chains to and from the cylinders 4. The chains for carrying the cloth pass along the grooves 21, along the one portion of the grooves 38, around the return wheels 39, along the other portion of the grooves 38, around the carrier wheels 40 around the chain races 9 of the first cylinder 4 of the series, around the chain races 7 of the first wheels 6 of the series and so on around all the cylinders, 4 and wheels 6 alternately to the carrier wheels 40 at the other end of the machine and then around these wheels 40 along the one portion of the grooves 38 around the other return wheel 39 along the other portion of the grooves 38 to the grooves 21 again.

The chains for carrying the cloth as illustrated by Figs. 15 to 17 consists of a plurality of links each of which consist of two parts securely fixed together. The one part consists of a block or carriage 41 adapted to work in the aforesaid grooves and the other part consists of the clip which is formed by means of an open fixed two jaw shaped or fork like structure 42, 43 having the under surface 44 of the lower jaw 42 curved to suit the curvature of the cylinders 4. The upper jaw preferably consists of two arms or the like 43$^a$ preferably connected by a strengthening web 45 formed in one with the lower jaw 42. Strengthening webs may also be provided between the jaws. Between the two arms 43$^a$ of the upper jaw a swiveling plate 46 is mounted and is adapted to close on to the upper surface 47 of the lower jaw 42 and retain the cloth between same. This swiveling plate 46 is provided with a tail piece or other projection 48 so that it may be automatically opened. Flanges or like projecting arms 49 may be provided on the swiveling plate 46 and engage in slots 50 in the lower jaw 42 so as to prevent too much cloth being gripped by the clip. The jaw part 42, 43 of the clip is secured to the carriage part 41 of the clip by suitable bolts or rivets 51.

This construction of clip enables the gripping part or edge to be made very thin and to lie very close to the cylinders 4. The carriage part 41 of each clip is connected to the carriage part of the adjacent clip by means of a double joint. This joint preferably consists of a fork member 52 pivotally connected to the one end of the carriage 41 by means of a pin 53 passing into the body 41 of same; an eye member 54 being similarly fitted to the other end of each carriage part 41 by means of a pin 53. The eye member 54 of the carriage is pivotally connected to the fork member 52 of the other carriage. The joint 55 between the two carriages enables the chain to bend around the cylinders 4 while the joint 53 between the carriages 41 and the fork 52 and eyes 54 enables the chain to bend at right angles to same, and around the return wheels 40 which are arranged in a horizontal plane. The upper and lower surfaces 53 of the carriage part 41 are also curved to suit the curvature of the rings 8 around the cylinders 4 and the grooved wheels 6. The return wheels, shown in detail Fig. 18, are provided with means for automatically opening the clips. This preferably consists of a disk or the like 57 fitted to or formed on the surface of the wheel 39 and adapted to engage the projecting tail part 48 of the clip as the carriage 41 engages in the groove of the wheel 39 and forces the clip open. As the chain rotates the return wheel 39, from the point of engagement to the point of release, when the chain leaves the wheel 39, there is no movement of the wheel 39 relative to the chain so that there is no friction between the clip and the opening disk.

The wheels 39 at the other end of the machine are provided with similar means to release the cloth.

According to a modified form of clip the movable jaws 46 are arranged to open in a direction away from the gripping surface 89 of the fixed jaw 42 and also in a direction away from the edge 90 of the clip nearest the cloth.

This movement is accomplished by pivoting the movable jaw 46 on a lever 91 mounted on the fixed jaw 42. The pivots 93, 94, 95, and 96 of the levers 91 and the links 92 are so positioned that the desired opening movement of the movable jaw 46 is obtained.

Figures 11, 41:
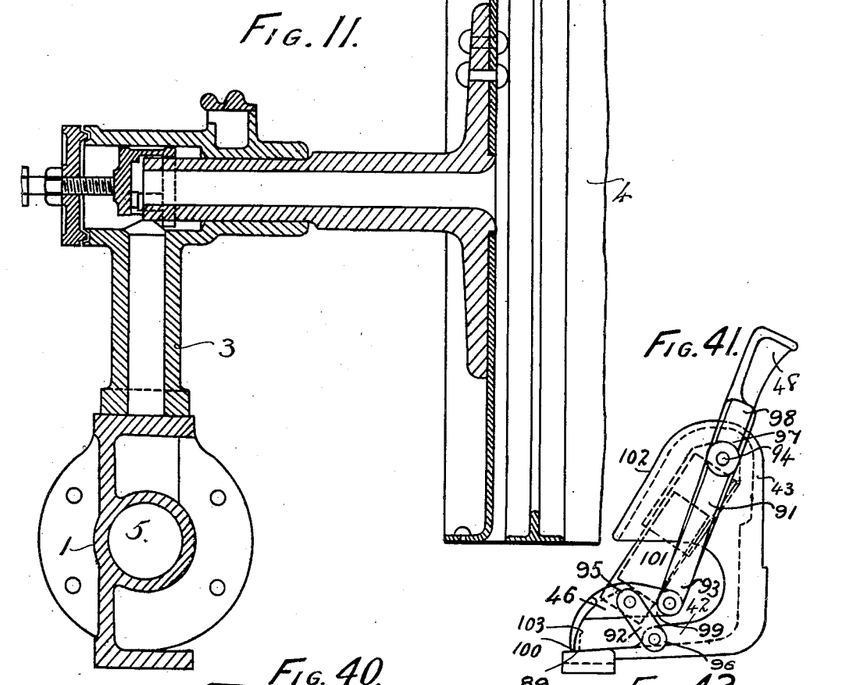
Fig. 11 is a transverse sectional elevation of the main frame and shows the end of one of the cylinders and the bearing for same.
Figs. 40 and 41 are respectively elevations at right angles to each other and Fig. 42 is a plan view of a modified form of link for the chain for carrying the cloth.
Figures 12, 13, 14, 31, 32, 33, 34, 37:
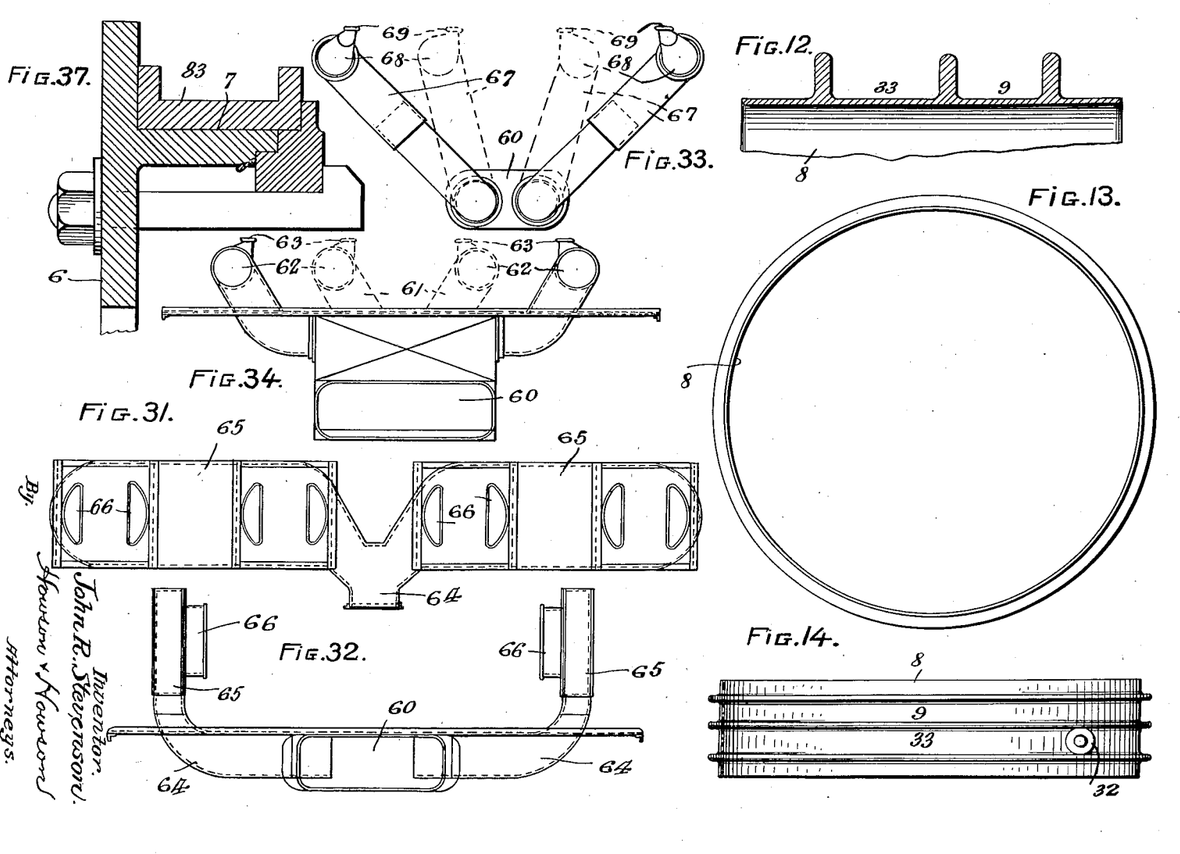
Fig. 12 is a sectional elevation and Figs. 13 and 14 are respectively an end view and a plan view of one of the slidable rings mounted on the cylinder.
Fig. 31 is an elevation of one of the side air boxes, looking from the line X—X (Fig. 29) in the direction of the arrows.
Figs. 32 to 34 are respectively elevations taken on the lines 32—32 (Fig. 29) 33—33 (Fig. 30) and 34—34 (Fig. 27).
Fig. 37 is a sectional elevation of a portion of one of the grooved wheels and illustrates a slip ring fitted into the groove of the wheel.
Figures 40, 42:
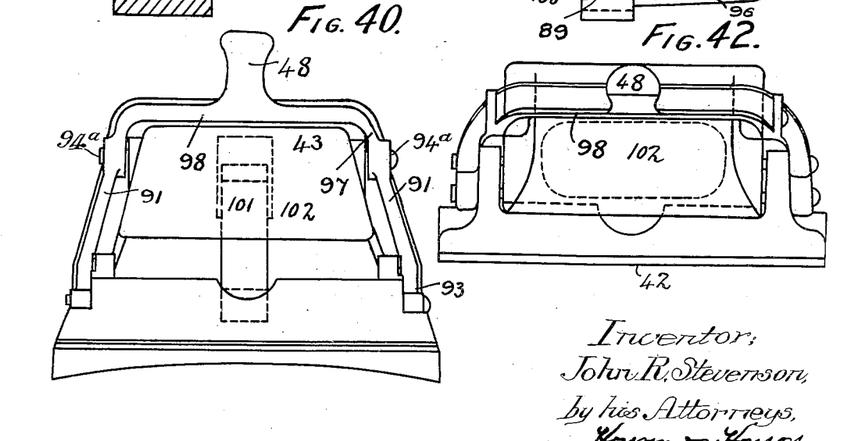

As illustrated by Figs. 40, 41 and 42 the fixed jaw 42 is adapted to be secured to the carriage part 41 of the chain by bolts or rivets 51 and is provided with an extension limb or arms 43 which is fitted with a pivot pin or the like 94$^a$ extending from end to end of the clip.

At both ends of the clip a lever 91 is mounted on this pin 94$^a$. The ends 97 of these two levers are connected at one end by a bridge or like member 98 so that the levers 91 and bridge 98 form a U shaped member. The other extremities 93 of these levers 91, or the limbs of the U, are pivoted to the movable jaw 46 or to arms or like extensions 99 thereof. Between the pivots 93 of the levers 91 and the gripping edge 100 of the movable jaw 46 a link 92 is pivoted at its one end 95 on each side of the clip. The other ends 96 of these links 92 are pivoted on the fixed jaw 42 at a point below the pivots 93 and 95 of the movable jaw 46. It will thus be seen that when the movable jaw 46 is opened the gripping edge 100 of same moves away from the gripping surface 89 of the fixed jaw 42 by swinging on its pivots 95 at the ends of the links 92; the links 92 also moving on their pivots 96 give the jaw 46 the movement desired away from the edge 90 of the clip nearest the cloth.

The clip is automatically opened by a tail piece 48 on the bridge part 98 of the U member engaging a suitable member on the machine, such as the wheel 39 (Fig 18).

The movable jaw 46 and the fixed jaw 42 or a part of the same, preferably the pivot pin 94$^a$ of the levers 91 are provided with thimbles or the like 101 adapted to slide one within the other and to contain between them a spring so as to automatically close the jaw 46 and to keep it closed on the cloth.

The extension member 43 of the fixed jaw 42 carrying the pivot pin 94$^a$ of the levers 91 is preferably formed with a hood or channel 102 so as to retain the heated air previously mentioned which is directed into the clip to keep same heated.

If desired by a slightly modified arrangement the pivoted jaw 46 and its lever 91 and links 92 may be dispensed with and the gripping surface 89 of the fixed jaw 42 provided with stenter pins 103 indicated by dotted line to receive the cloth.

Air boxes or chambers are arranged along both sides of the machine and heated air is led to same from any suitable source of supply. These boxes are adapted to direct the heated air by means of suitable ducts or pipes into the machine preferably through the spokes or open parts of the grooved wheels 6. On the axles of these wheels a disk or baffle plate may be secured and the heated air striking against the disk is deflected on to the clips and into the space or channel formed between the two jaws 42 and 43 of the clip. The air also passes over the edge of the baffle plate into the space formed by the cloth as it is carried by the chains around the grooved wheels 6.

As illustrated in detail by Figs. 23 to 34 the air is forced by a suitable fan or the like 58 with a suitably constructed air heater 59 and from the heater with a main air duct 60 arranged longitudinally and centrally below the lower parts of the machine. Branch ducts 61 conduct heated air from duct 60 into boxes 62 formed with elongated slots or nozzles 63 adapted to direct the air on to the selvages of the cloth. As shown the boxes 62 are slidably mounted on the ducts 61 so as to be capable of adjustment to suit different widths of cloth.

Branch ducts 64 supply air from main duct 60 to main side boxes 65 having nozzle 66 adapted to supply heated air into the machine through the spokes of the grooved wheels 6 and other open parts of the machine. The boxes 65 are slidably mounted on the ducts 64 so as to be capable of adjustment across the machine and the nozzles 66 are slidably mounted so as to be capable of vertical adjustment. The nozzles 66 are connected to the grooved wheels 6 so that when the grooved wheels are raised or lowered the nozzles slide vertically with them. Branch ducts 67 also conduct the air to boxes 68 having slots or nozzles 69 adapted to direct the air on to the selvages of the cloth. These ducts 67 are telescopically and pivotally mounted so that the boxes 68 may be moved toward each other or apart.

The grooved wheels 6 at one or both sides of the machine may be raised and lowered so as to impart to the cloth being carried by same a stretch or pull at an angle to the crosswise pull on the cloth.

This is for the purpose of imparting an "elastic" finish to the cloth and consists in providing means whereby every alternate wheel 6 at the one side (or at both sides) of the machine may be raised or lowered while the other wheels at the same side are lowered or raised.

When this "elastic" finish is to be imparted to the cloth the positions of the wheels 6 are first adjusted, that is the first wheel on the one side of the machine is, say, lowered while the next wheel is raised, the third wheel lowered and the fouth raised and so on. The wheel on the other side of the machine opposite the aforesaid first wheel is raised, the next wheel lowered and so on. Of course it is not necessary that every wheel on both sides of the machine requires to be adjusted it is only necessary that the positions of each alternate wheel on the one side is lower than the other wheels at the same side while the wheels on the other side opposite the lower wheels are arranged at a higher position than the wheels opposite the higher wheels on the first mentioned side. This adjustment may be effected either by moving every wheel or only every alternate wheel.

The positions of these wheels are adjusted from the one common operating member such as a hand wheel before the cloth is passed through the machine.

Figure 1:
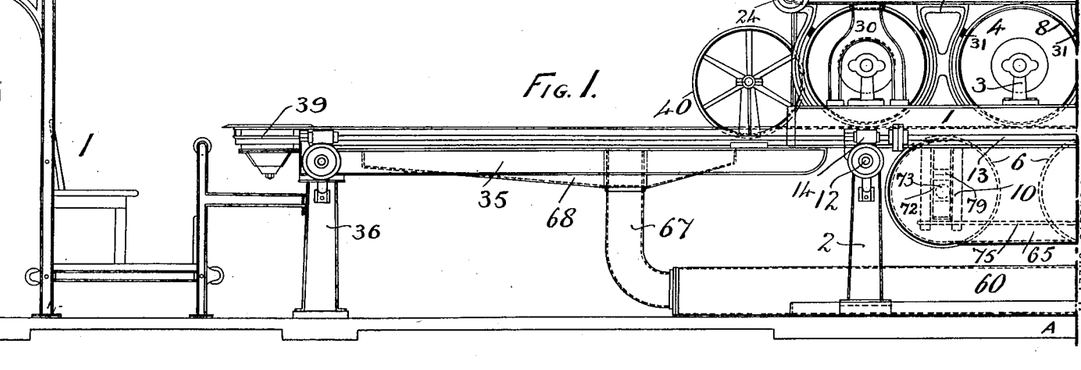
Figure 1 is an elevation of part of a stentering machine constructed according to the improvements of this invention.
Figure 2:
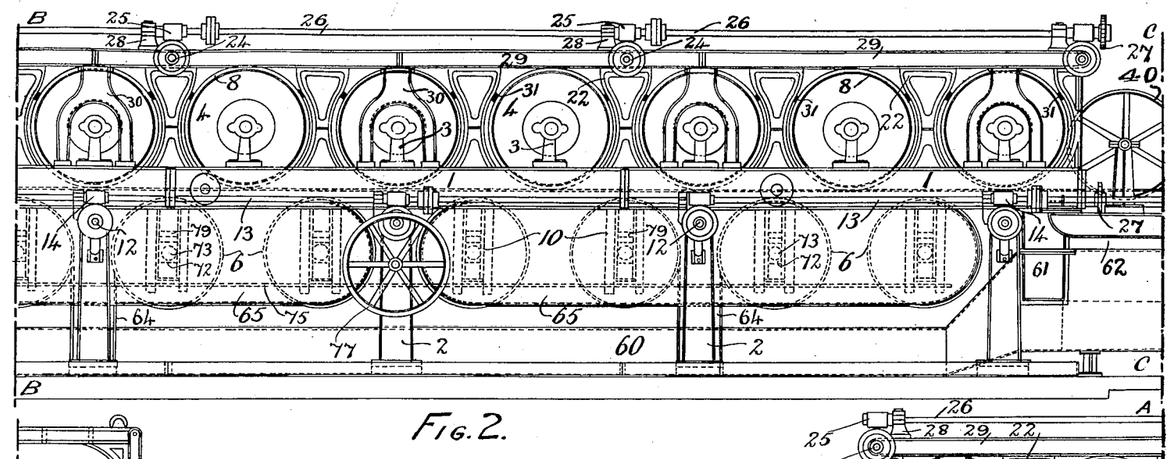
Fig. 2 is an elevation of another part of the machine and Fig. 3 is an elevation of a third part.
Figure 3:
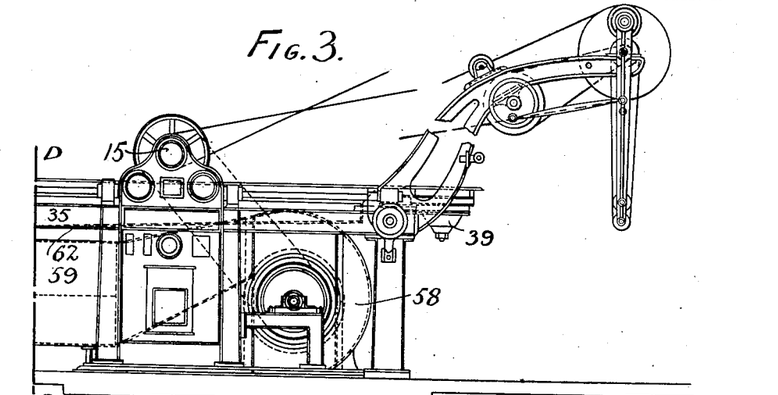
Figure 4:
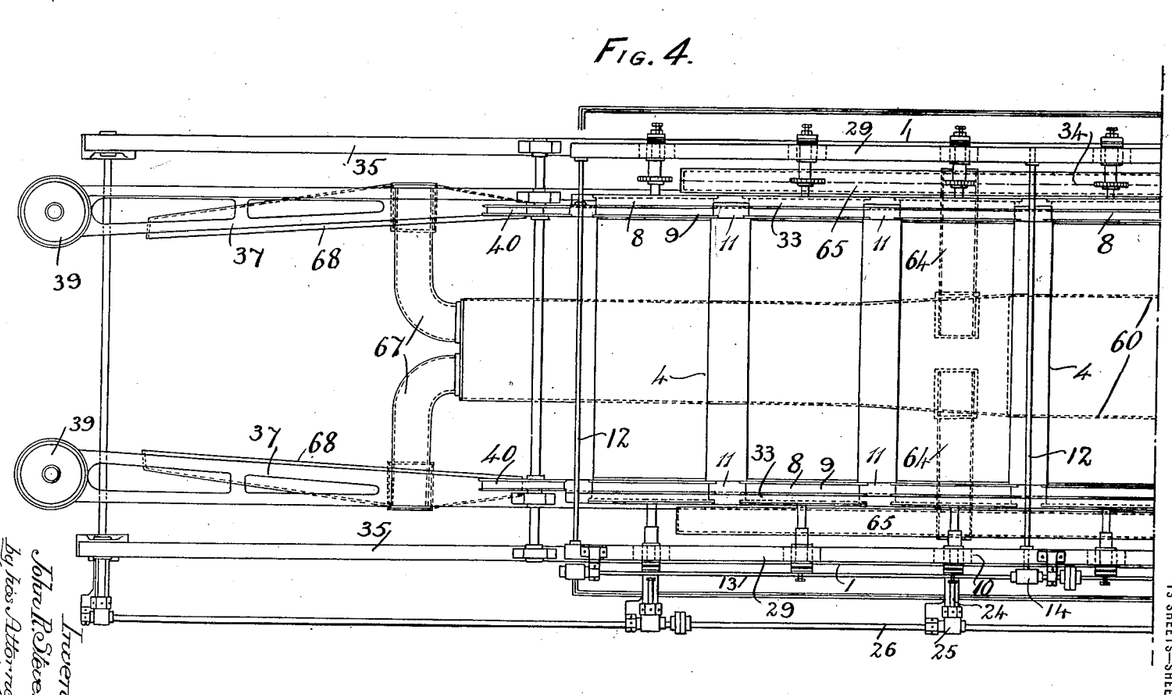
Figs. 4, 5 and 6 are respectively plan views of parts of the machine illustrated by Figs. 1 to 3, and to connect these three plan views the line E—E (Fig. 4) coincides with the line F—F (Fig. 5) and the line G—G (Fig. 5) coincides with the line H—H (Fig. 6).
Figure 5:
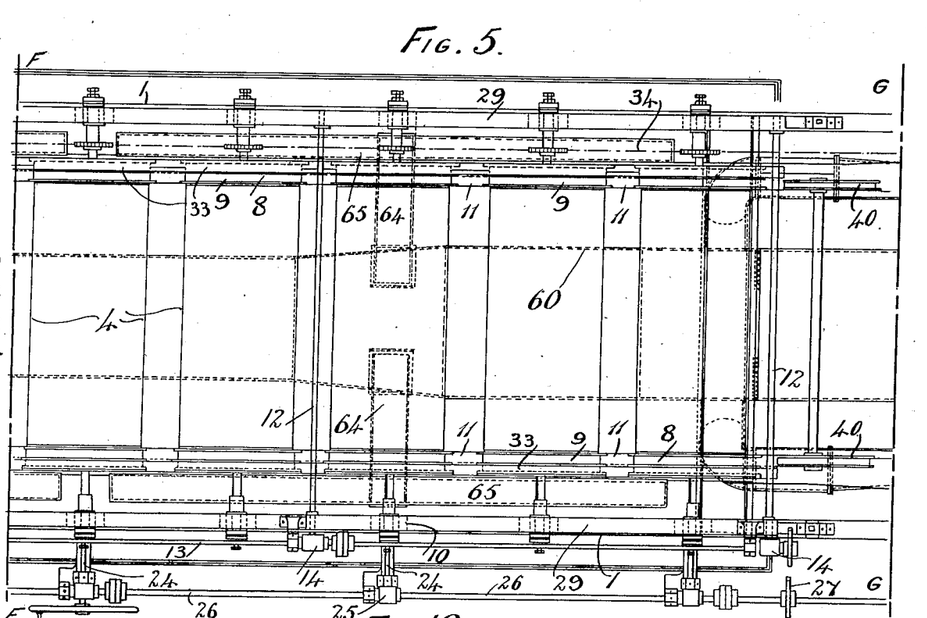
Figure 6:
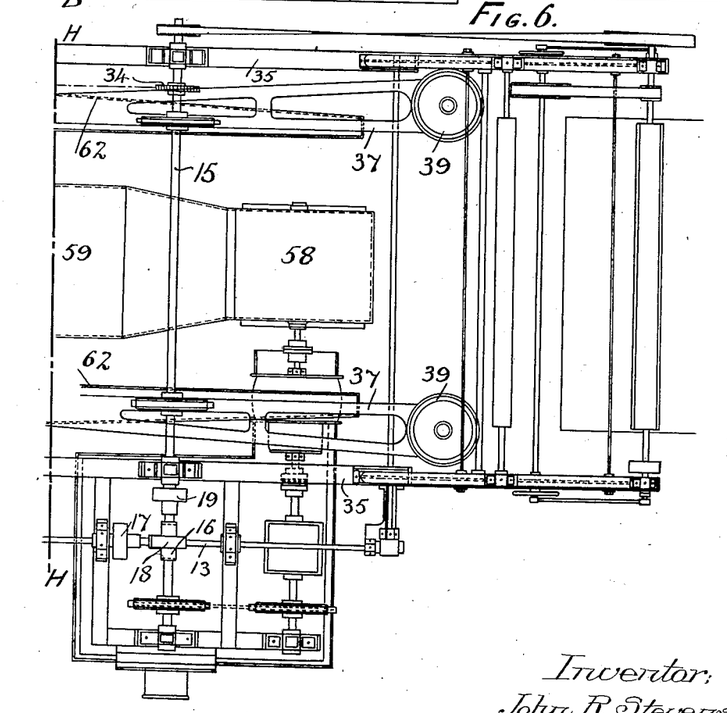
Figure 7:
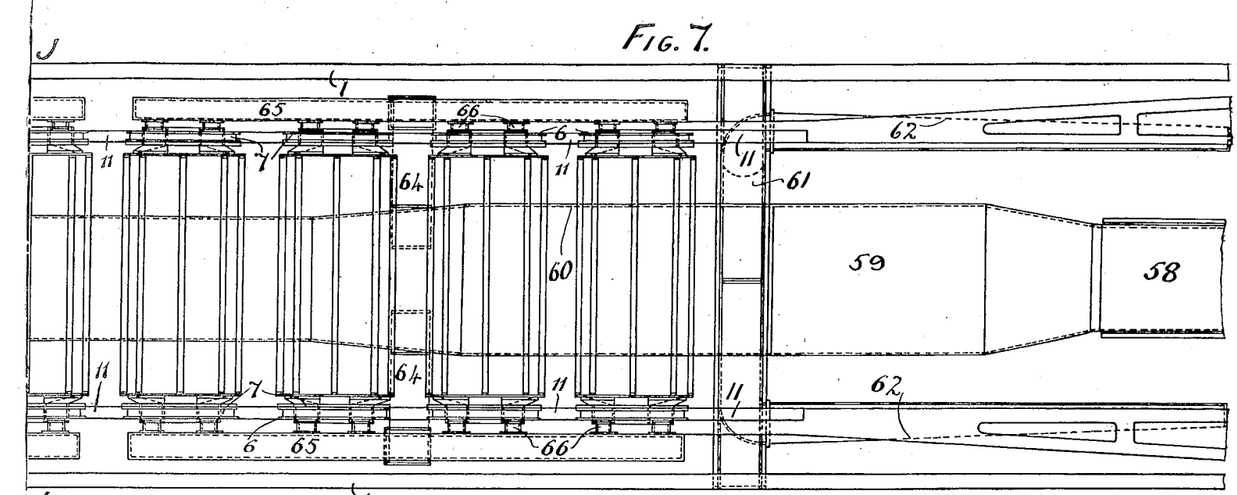
Figs. 7 and 8 are respectively part plan views of the lower parts of the machine with the cylindrical cans and upper framework removed and to connect these views the line J—J (Fig. 7) coincides with the line K—K (Fig. 8).
Figure 8:
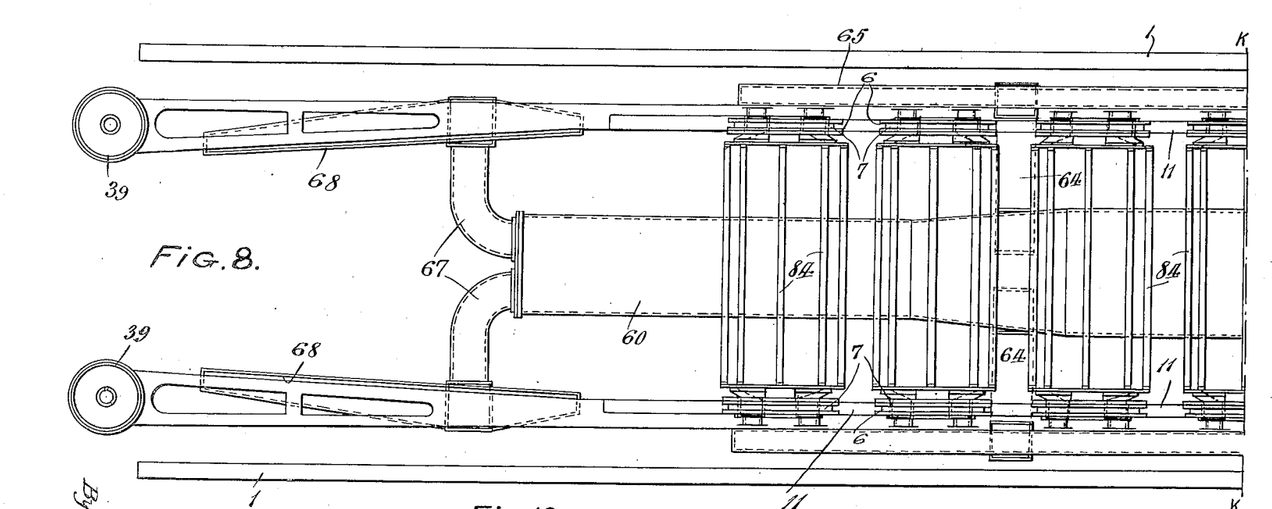
Figure 9:
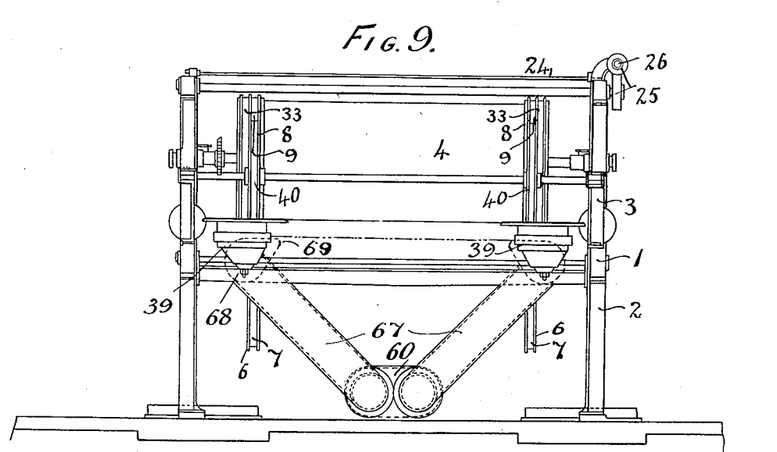
Figs. 9 and 10 are end elevations of the machine.
Figure 10:
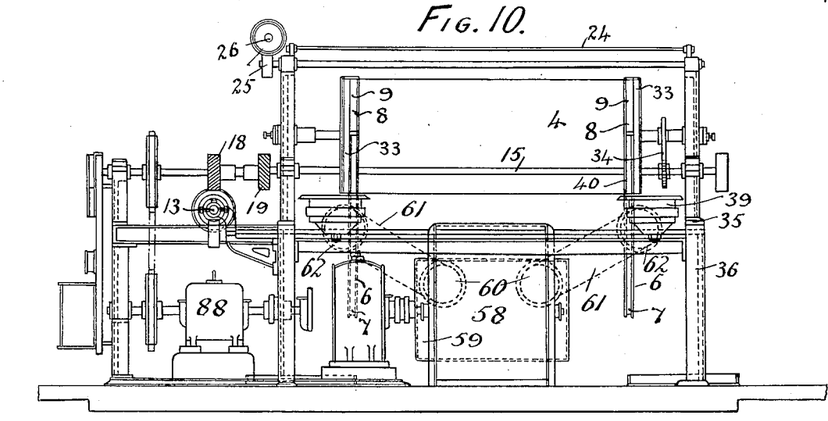
Figure 39:
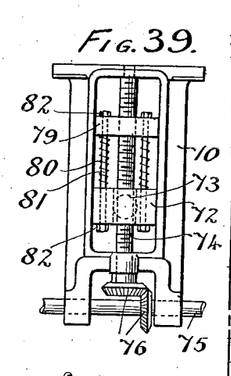
Fig. 39 is an elevation illustrating the means for raising and lowering the grooved wheels and of the compensating devices for the chain for carrying the cloth.

As illustrated by Figs. 1, 2, and 39 this may consist of a bracket 10 secured to the frame 11 and provided with a slidable block 72 which carriers the axle 73 of the wheel 6. A screwed rod 74 passes freely through a hole in the block 72 and is carried in suitable bearings provided in the bracket 10. The screwed rods 74 for each wheel 6 are rotated from shaft 75 by means of bevel wheel or other suitable gear 76 and the shaft 75 is rotated by means of a hand wheel 77 and bevel wheel or other suitable gear. Above the block 72 another block 79 is slidably mounted on the bracket 10 and the screwed rod 74 engages therein. Springs 80 mounted on rods 81 are arranged between the two blocks 72 and 79 and stops 82 or the like support the block 72.

It will be readily understood that when the hand wheel 77 is rotated the screwed rods are rotated by means of the mechanism 75 and 76, and the blocks 79 are moved upward or downward carrying with them the blocks 72 the axles 73 and the wheels 6 on either one side of the machine or the other.

The springs 80 form automatic adjustment or compensating devices for the chains to take up the change in length due to expansion and contraction of same by change of temperature.

The mechanism for drawing inward and outward the inner movable frames may be provided with a suitable indicator or gage to show the width at which the chains are working.

The grooved wheels 6 at the one side of the machine may be connected to the grooved wheels 6 directly opposite by telescopic rods or drums.

This arrangement may consist in providing a slip ring 83 (Fig. 35) for the groove in the wheel 6 and in connecting the wheel 6 at the one side of the machine by telescopic rods or tubes 84 to the wheel 6 opposite same; the two wheels 6 being attached by means of a telescopic axle 85 (Fig. 38) provided with suitable joints 86. The telescopic tubes 84 are provided with suitable joints 87.

Another arrangement for the same purpose may consist of disks or spider frames secured to the inner ends of the wheel axles which do not rotate, and provided with suitable ball bearing joints for telescopic rods or spindles 84 which when fitted into same can rotate about their own axis and at same time can be inclined at an angle to the horizontal as the wheel 6 at the one side or the other is raised or lowered. A further arrangement for the same purpose may consist of a skeleton frame or drum formed by telescopic bars or tubes 84 having hook like ends adapted to engage a channel or rail secured to the face or boss of the grooved wheels 6. This drum would be mounted on a telescopic axle provided with suitable joints.

The rotatable telescopic rods or drums 84 may be provided with members adapted to keep their surfaces clean.

Doctors or like cleaning devices may also be provided and suitably arranged for the cylinders 4.

Instead of heated cylinders 4 being used openwork cylinders or perforated drums may be used so that heated air may be used as the drying medium and directed on to the cloth.

Preferably one electric motor 88 drives in unison all the various parts of the machine, such as the air forcing fan or the like 58 the cylinders 4 and the chains.

The speed at which the machine operates may be regulated by suitable variable speed gear.

What I claim and desire to secure by Letters Patent is:—

1. A stentering machine for textile fabrics comprising a series of heated rotatable cylinders; slidable rings mounted on each of said cylinders; a chain race groove and a positioning groove on each of said slidable rings; structures adjustably movable to and from each other; chain races provided on said structures; and devices fitted to said structures operating in said positioning grooves and adapted to positively position said slidable rings as said structures are drawn together or apart.

2. A stentering machine for textile fabrics comprising a series of heated rotatable cylinders; a positively positioned slidable chain race on each cylinder; structures adjustably movable to and from each other; wheels grooved to form chain races mounted on said structures and arranged below and between each cylinder and its neighbor;

chain race grooves and return wheels provided on said structures; chains of cloth carrying clips; and double joints between each clip and its neighbour adapted to enable said chains to bend in a vertical plane around said cylinders and said grooved wheels and to bend in a horizontal plane around said return wheels.

3. A stentering machine for textile fabrics comprising a series of heated rotatable cylinders; a positively positioned slidable chain race on each cylinder; structures adjustably movable to and from each other; chain race grooves, return wheels, and wheels grooved to form chain races, provided on said structures; a plurality of carriages slidable in said chain races; horizontal and vertical pivot pins between each carriage and its neighbor; a bracket secured to each carriage; and a pivoted jaw on said bracket.

4. A stentering machine for textile fabrics comprising a series of heated rotatable cylinders; a positively positioned slidable chain race on each cylinder; structures adjustably movable to and from each other; chain race grooves, return wheels, and wheels grooved to form chain races, provided on said structures; a plurality of carriages slidable in said chain races; horizontal and vertical pivot pins between each carriage and its neighbor; a bracket secured to each carriage; a lever; a cloth gripping jaw; a link; and pivots for said lever, jaw and link so disposed that the gripping edge of said jaw has an opening movement in a resultant direction obtained by the combination of a movement in a direction at right angles to the gripping surface of said bracket and of a movement parallel to said gripping surface.

5. A stentering machine for textile fabrics comprising a series of heated rotatable cylinders, a slidable chain race mounted on each of said cylinders, movable structures, wheels grooved to form a chain race provided on said structures and arranged below and between each cylinder and its neighbor of the said series of cylinders, grooves forming chain races, also provided on said structures, chains of cloth holding clips, return wheels, grooves in said wheels and disks also formed on said wheels, for automatically opening said clips substantially as herein set forth.

6. A stentering machine for textile fabrics comprising a series of heated rotatable cylinders; a positively positioned slidable chain race on each cylinder; structures adjustably movable to and from each other; wheels grooved to form chain races mounted on said structures and arranged below and between each cylinder and its neighbor; a plurality of telescopic jointed rods or tubes connecting each grooved wheel on the one side of the machine with the grooved wheel opposite same on the other side of the machine; a telescopic and jointed axle; a slip ring for said grooved wheel; and double joints between said telescopic jointed rods or tubes and said grooved wheels.

7. A stentering machine for textile fabrics comprising a series of heated rotatable cylinders; a positively positioned slidable chain race on each cylinder; structures adjustably movable to and from each other; wheels grooved to form chain races mounted on said structures and arranged below and between each cylinder and its neighbor; frames secured to the axles of said wheels; swiveling ball bearing joints on said frames; and rotatable and telescopic rods or spindles in said joints.

8. A stentering machine for textile fabrics comprising a series of heated rotatable cylinders; a positively positioned slidable chain race on each cylinder; structures adjustably movable to and from each other; wheels grooved to form chain races mounted on said structures and arranged below and between each cylinder and its neighbor; a channel or rail secured to said wheel; a skeleton frame of telescopic bars or tubes; hook like ends on said frame adapted to engage in said channel; and a telescopic jointed axle.

9. A stentering machine for textile fabrics comprising a series of heated rotatable cylinders; a positively positioned slidable chain race on each cylinder; structures adjustably movable to and from each other; wheels grooved to form chain races mounted on said structures and arranged below and between each cylinder and its neighbor; a bracket; a slidable block mounted therein and carrying said wheels; a screwed spindle passing freely through said block; a second slidable block mounted on said spindle and engaging therewith; rods connecting said two slidable blocks; springs mounted on said rods; a horizontal shaft; bevel gearing between said shaft and the said screwed spindle; and hand wheel operating mechanism for said shaft.

10. A stentering machine for textile fabrics comprising a series of heated rotatable cylinders; a positively positioned slidable chain race on each cylinder; structures adjustably movable to and from each other; chain race grooves, return wheels, and the wheels grooved to form chain races, provided on said structures; chains of cloth gripping devices slidable in said chain races; a main hot air duct arranged centrally below the said cylinders; branch ducts; air boxes arranged adjacent to said chain races; and nozzles so disposed as to direct heated air into the selvages of the fabric carried by said chains of cloth gripping devices.

11. A stentering machine for textile fabrics comprising a series of heated rotatable cylinders; a positively positioned slidable chain race on each cylinder; structures adjustably movable to and from each other; chain race grooves, return wheels, and wheels grooved to form chain races, provided on said structures; chains of cloth gripping devices slidable in said chain races; a main hot air duct arranged centrally below the said cylinders; branch ducts; air boxes arranged adjacent to said chain races, nozzles so disposed as to direct heated air in to the selvages of the fabric carried by said chains of cloth gripping devices; and means whereby the position of said nozzles and boxes is adjustable in relation to the said movable structures as the latter are moved to and from each other and also in relation to said grooved wheels as the position of same is changed.

In testimony whereof I have signed my name to this specification in the presence of two subscribing witnesses.

JOHN R. STEVENSON.

Witnesses:
 JOHN STEWART,
 AGNES S. D. WISHART.